US009730144B2

(12) United States Patent
Apostolakis

(10) Patent No.: US 9,730,144 B2
(45) Date of Patent: Aug. 8, 2017

(54) SYSTEM AND METHOD FOR MIXED-MESH WIRELESS NETWORKING

(76) Inventor: Costa Apostolakis, Locust Grove, VA (US)

(*) Notice: Subject to any disclaimer, the term of this patent is extended or adjusted under 35 U.S.C. 154(b) by 0 days.

(21) Appl. No.: 13/285,430

(22) Filed: Oct. 31, 2011

(65) Prior Publication Data

US 2012/0106394 A1    May 3, 2012

Related U.S. Application Data

(60) Provisional application No. 61/408,821, filed on Nov. 1, 2010.

(51) Int. Cl.

| H04W 16/00 | (2009.01) |
|---|---|
| H04W 40/28 | (2009.01) |
| H04L 29/06 | (2006.01) |
| H04L 12/715 | (2013.01) |
| H04W 24/00 | (2009.01) |
| H04W 84/18 | (2009.01) |

(52) U.S. Cl.
CPC .......... *H04W 40/28* (2013.01); *H04L 69/18* (2013.01); *H04L 45/04* (2013.01); *H04W 24/00* (2013.01); *H04W 84/18* (2013.01)

(58) Field of Classification Search
None
See application file for complete search history.

(56) References Cited

U.S. PATENT DOCUMENTS

| 2008/0001735 | A1* | 1/2008 | Tran | 340/539.22 |
|---|---|---|---|---|
| 2008/0004904 | A1* | 1/2008 | Tran | 705/2 |
| 2009/0196210 | A1* | 8/2009 | Desai | 370/311 |
| 2010/0034386 | A1* | 2/2010 | Choong | H04L 9/0894 380/270 |
| 2011/0196547 | A1* | 8/2011 | Park et al. | 700/296 |
| 2011/0307539 | A1* | 12/2011 | Maria | 709/202 |
| 2012/0046000 | A1* | 2/2012 | Gao et al. | 455/73 |
| 2012/0050971 | A1* | 3/2012 | Seal et al. | 361/679.02 |
| 2012/0076061 | A1* | 3/2012 | Desai | 370/311 |
| 2012/0223840 | A1* | 9/2012 | Guymon et al. | 340/870.02 |
| 2012/0243494 | A1* | 9/2012 | Trachewsky | 370/329 |

* cited by examiner

*Primary Examiner* — Chi H Pham
*Assistant Examiner* — Soon-Dong D Hyun
(74) *Attorney, Agent, or Firm* — Christopher Paul Mitchell

(57) ABSTRACT

A mixed mesh wireless network that includes a Mixed Mesh network 105, and Energy Data Server (EDS) 110, EDS database 115, a Utility portal 130, and a Consumer portal 140. The EDS Server 110 is connected to Utility portal 130, Consumer portal 140 and EDS database 115 via a VPN. The wireless network 100 is adapted to connect end devices 150, for example, thermostats, meters, switches and other ZigBee supporting devices, appliances, or electronic devices to mixed mesh network 105. The network 100 is further adapted to connect mixed mesh network 105 to multiple consumer or end user applications 160 via the Internet, for example, desktops, notebooks, smart phones, or other computing or communications devices that may be used to manage, access and/or control end devices 150.

5 Claims, 4 Drawing Sheets

SYSTEM AND METHOD FOR MIXED-MESH WIRELESS NETWORKING

CROSS-REFERENCE TO RELATED APPLICATIONS

This application claims the benefit of priority from U.S. Provisional Patent Application No. 61/408,821 filed on Nov. 1, 2010.

BRIEF DESCRIPTION OF THE DRAWINGS

The principles and operation of the system, apparatus, and method according to the present invention may be better understood with reference to the drawings, and the following description, it being understood that these drawings are given for illustrative purposes only and are not meant to be limiting, wherein.

Figure 1:
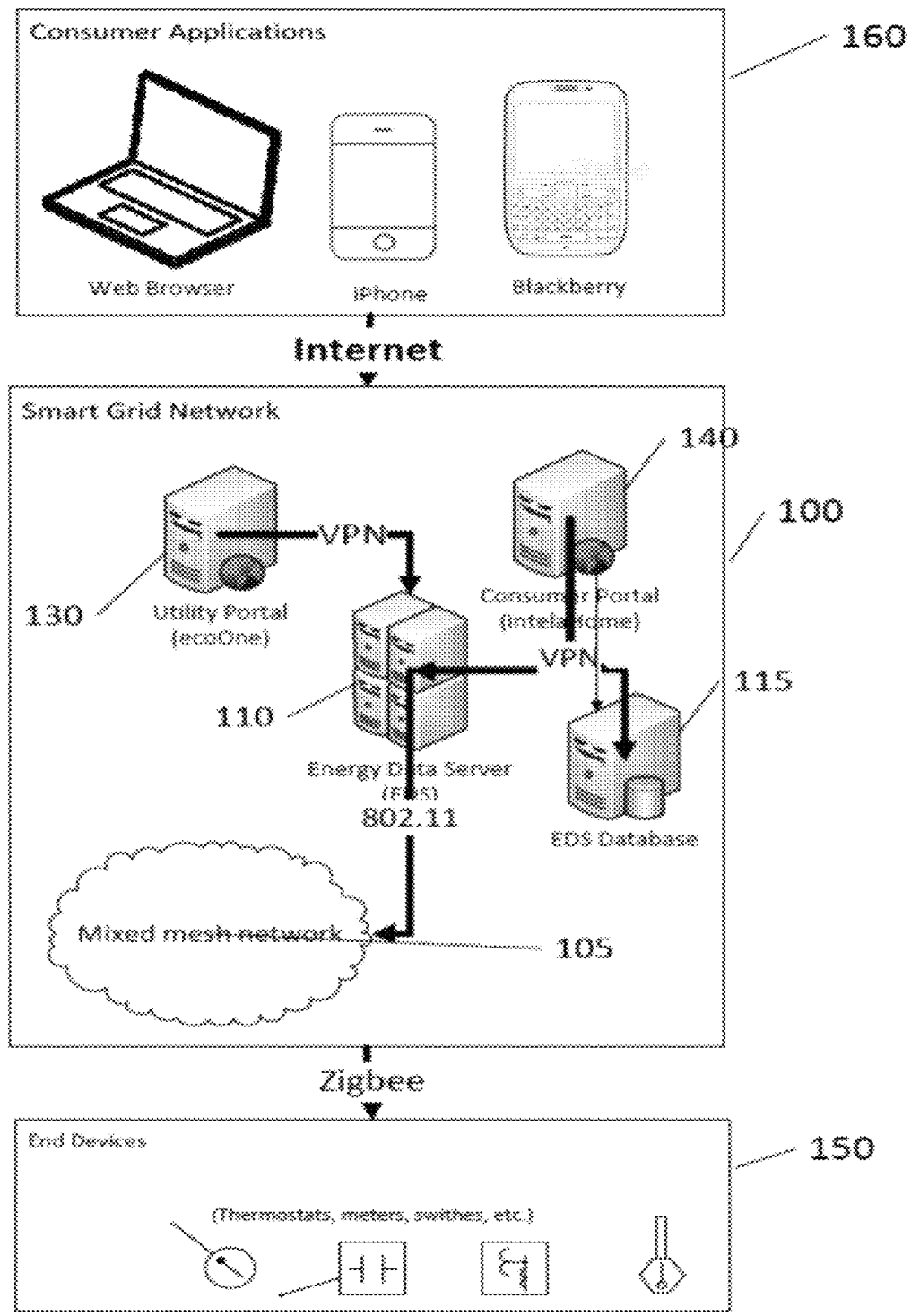
FIG. 1 is a schematic block diagram of a system for enabling mixed mesh wireless networking, according to some embodiments.

It will be appreciated that for simplicity and clarity of illustration, elements shown in the drawings have not necessarily been drawn to scale. For example, the dimensions of some of the elements may be exaggerated relative to other elements for clarity. Further, where considered appropriate, reference numerals may be repeated among the drawings to indicate corresponding or analogous elements throughout the serial views.

DETAILED DESCRIPTION OF THE INVENTION

The following description is presented to enable one of ordinary skill in the art to make and use the invention as provided in the context of a particular application and its requirements. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In other instances, well-known methods, procedures, and components have not been described in detail so as not to obscure the present invention.

The phrase "mixed mesh network" as used herein may encompass communications networks that incorporate multiple networking technologies or protocols, such as 802.11 and 802.15.4 protocols or other protocols or combinations of protocols.

Embodiments of the present invention enable mixed mesh wireless networking, according to some embodiments. Such mixed mesh networking may enable multiple networking technologies to operate in a substantially integrated communications network, such as, for example, an electric network being used for data communications, or a smart electric grid.

Reference is now made to FIG. 1, which is a schematic block diagram of a mixed mesh wireless network, and in particular, a Smart Grid mixed mesh wireless network 100, according to some embodiments. As can be seen in FIG. 1, the network 100 may include a Mixed Mesh network 105, and Energy Data Server (EDS) 110, EDS database 115, a Utility portal 130, and a Consumer portal 140. In some embodiments EDS Server 110 is connected to Utility portal 130, Consumer portal 140 and EDS database 115 via a VPN; however other network communications devices, systems and protocols may be used. Smart Grid network 100 is adapted to connect end devices 150, for example, thermostats, meters, switches and other ZigBee supporting devices, appliances, or electronic devices to mixed mesh network 105. Smart Grid network 100 is further adapted to connect mixed mesh network 105 to multiple consumer or end user applications 160 via the Internet, for example, desktops, notebooks, smart phones, or other computing or communications devices that may be used to manage, access and/or control end devices 150. Smart Grid mixed mesh wireless network 100 enables messages or data to be transmitted or exchanged over the network, whether using Wi-Fi or ZigBee protocols, and helps determine the appropriate route for the data so as to make the communications flow effective, efficient, and transparent to the applications being used. Smart Grid mixed mesh wireless network 100 may enable mixed mesh wireless networking in electricity networks or other data or communications networks.

Energy Data Server (EDS) 110 may include an interface for at least two-way communications with end devices 150. EDS database 115 may include a database for tracking the health or status of the communication network as well as various data elements captured from end devices 150. Utility portal 130 may include a user interface that is web-based and allows for network management and interaction (e.g., grid network management and interaction for a Utility company) with the core functionality provided by the EDS server (e.g., network and grid management, monitoring etc.). Consumer portal 140 may include a user interface for the end consumer or remote user to monitor and/or manage grid or network usage, as for example, energy usage. According to some embodiments, Consumer portal 140 may be used for reviewing energy demand statistics and controlling thermostat functionality remotely.

Figure 2:
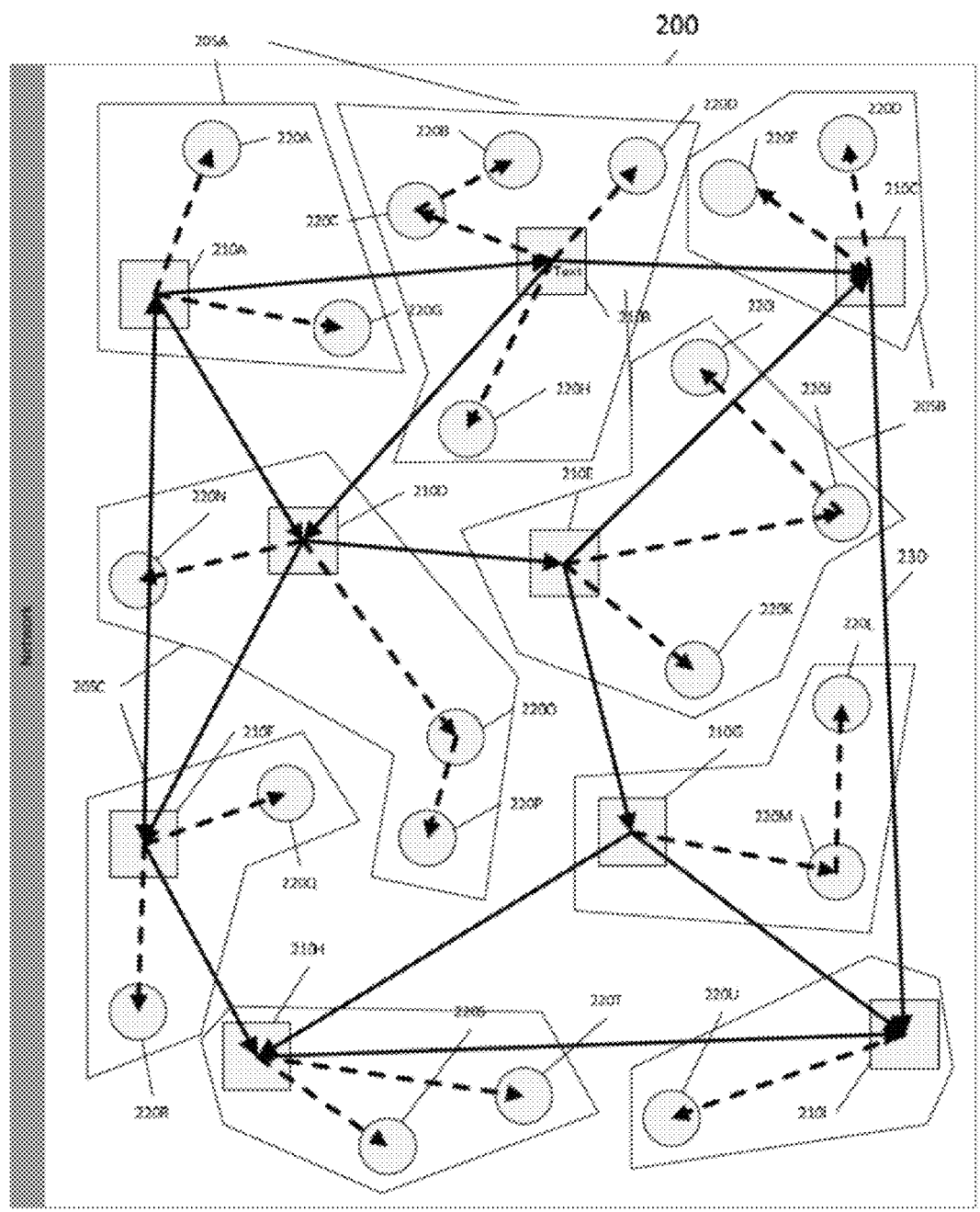
FIG. 2 is a schematic block diagram of a mixed mesh wireless network according to some embodiments.

Mixed Mesh Network 105, which enables messages or data to be exchanged over smart grid network without regard for whether the communication utilizes Wi-Fi or ZigBee, can be understood further with reference to FIG. 2, which is a schematic block diagram describing an example of a mixed mesh composition, according to some embodiments. As can be seen in the figure, Mixed Mesh network 200 includes multiple Mixed Mesh communication devices (hereinafter referred to as Electric circuit Communication Network devices or Econet devices, according to some embodiments) 210, and multiple end devices 220. Each Econet devices 210 may be setup independently of an existing network configuration. For example, each Econet devices 210 may be given a WiFi SSID key and a ZigBee key, thereby enabling any other devices (Econet or end devices) that have that baseline configuration to join the network and communicate with the Econet devices. Econet devices may typically be set up at selected geographical points in the network to enable sufficient points to facilitate network quality, stability, redundancy etc. Straight lines 230 represent Wi-Fi communication links, and dashed lines 240 represent ZigBee links. As can be seen in the figure, end devices 220 may communicate with each other or with the Smart Grid network by direct ZigBee communications, by hopping over Econet devices, or by utilizing ZigBee to communicate with the Econet devices. Econet devices typically use Wi-Fi communication links to communication with eachother; however they may also use ZigBee communications links, partially or entirely, to communicate with each other.

In some embodiments, a mixture of ZigBee end devices 220, such as switches, meters, appliances or other devices with ZigBee transmitters/transceivers may, together with a mixture of Econet devices, form a Mixed Mesh cell 205, for example, cells 205A-C etc. End devices 220 may move between cells and/or may be assigned or incorporated with multiple cells. Cells 205 may change and be dynamic based on the changing environment. For example, cell sizes, compositions, positions etc. may be changed on a random or regular basis, optionally in real time, to reflect the changing networking environment. The resulting Mixed Mesh network 200 typically handles wireless local area network (WLAN) computer communication using 802.11 protocol. Mixed Mesh networks 200 generally have at least one access point to a communications backbone, such as a fiber back bone. A communications backbone, optionally connected to one or more Econet devices may connect Mixed Mesh network 200 to an EDS Server 110, or to a supervisory control and data acquisition (SCADA) control system or other suitable element for managing or controlling a smart grid, for example a Utility Smart Grid Network 150. Optionally, the communications backbone may connect multiple Mixed Mesh cells 205 to each other and/or to other network cells or devices.

According to some embodiments, each Econet device 210 may service approximately 30-100 ZigBee end devices 220, or approximately 10-20 homes or locations. Of course, other numbers of Econet points, ZigBee end devices and/or EDS's may be used, in accordance with required expense parameters, bandwidth parameters, access parameters etc. In one preferred embodiment each Econet device 220 may services approximately 15 ZigBee based homes or locations with multiple devices or approximately 45 ZigBee end devices.

Furthermore, according to some embodiments, each Mixed Mesh network 105 may service approximately 10 mixed mesh cells 205, or approximately 450 ZigBee end devices. Each EDS server 110 may service approximately 55 Mixed Mesh network 105, or approximately 450 homes or locations with multiple devices. Of course, other numbers of Econet points, ZigBee end devices and/or EDS's may be used, in accordance with required expense parameters, bandwidth parameters, access parameters etc. Furthermore, network devices supporting additional or alternative communications protocols may be used.

Figure 3:
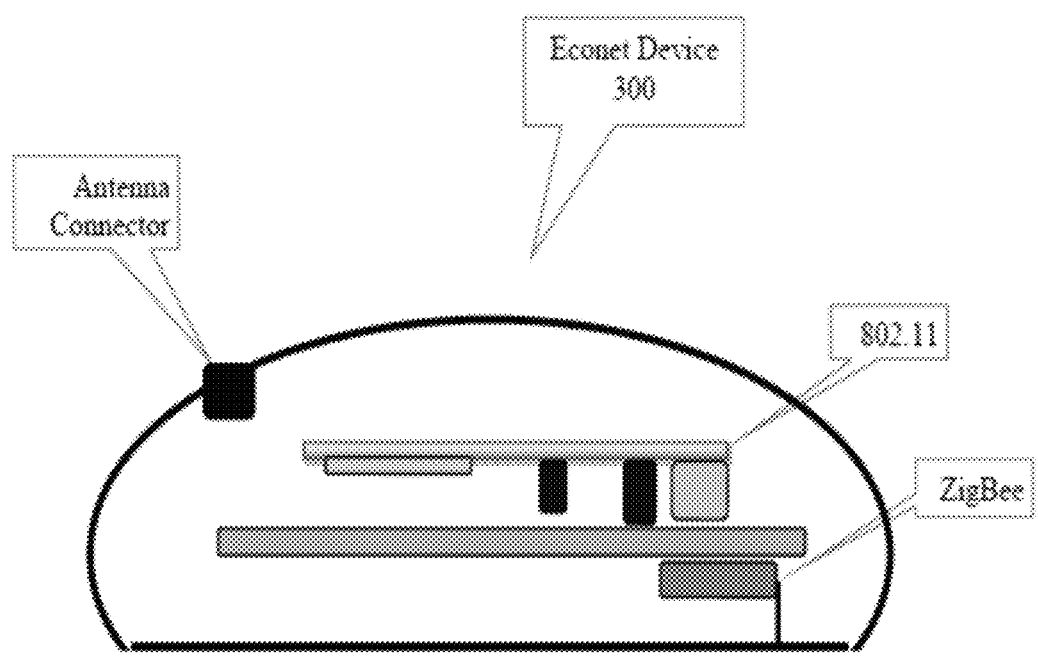
FIG. 3 a schematic block diagram of an example of a mixed mesh wireless device configuration, according to some embodiments.

According to some embodiments, two or more standards based wireless gateways may be managed simultaneously with substantially seamless operation. For example, Econet points 210 may have a ZigBee (802.15.4) transceiver and PCB as well as a WLAN (802.11) communications Transceiver and PCB. As can be seen with reference to FIG. 3, Econet devices or points 300 may include an antenna connector, and may further include a Multi-Mesh Processor integrating both WLAN (e.g., 802.11 protocol) components and ZigBee (e.g. 802.15.4 protocol) components. Of course, other components, combinations of components, and configurations of components may be used.

Accordingly, For example, such a mixed-mesh processor may handle and transmit data representing both 802.11 and 802.15.4 network devices, thereby enabling substantially single management and security systems to run the resulting Mixed Grid Networks. In some embodiments other communications protocols or combinations of protocols may be used. In some embodiments more than 2 protocols may be used. Such a resulting Mixed Grid Network may enable effective mixed network management as well as communications redundancy, as different gateways may be used by the different protocols.

Figure 4:
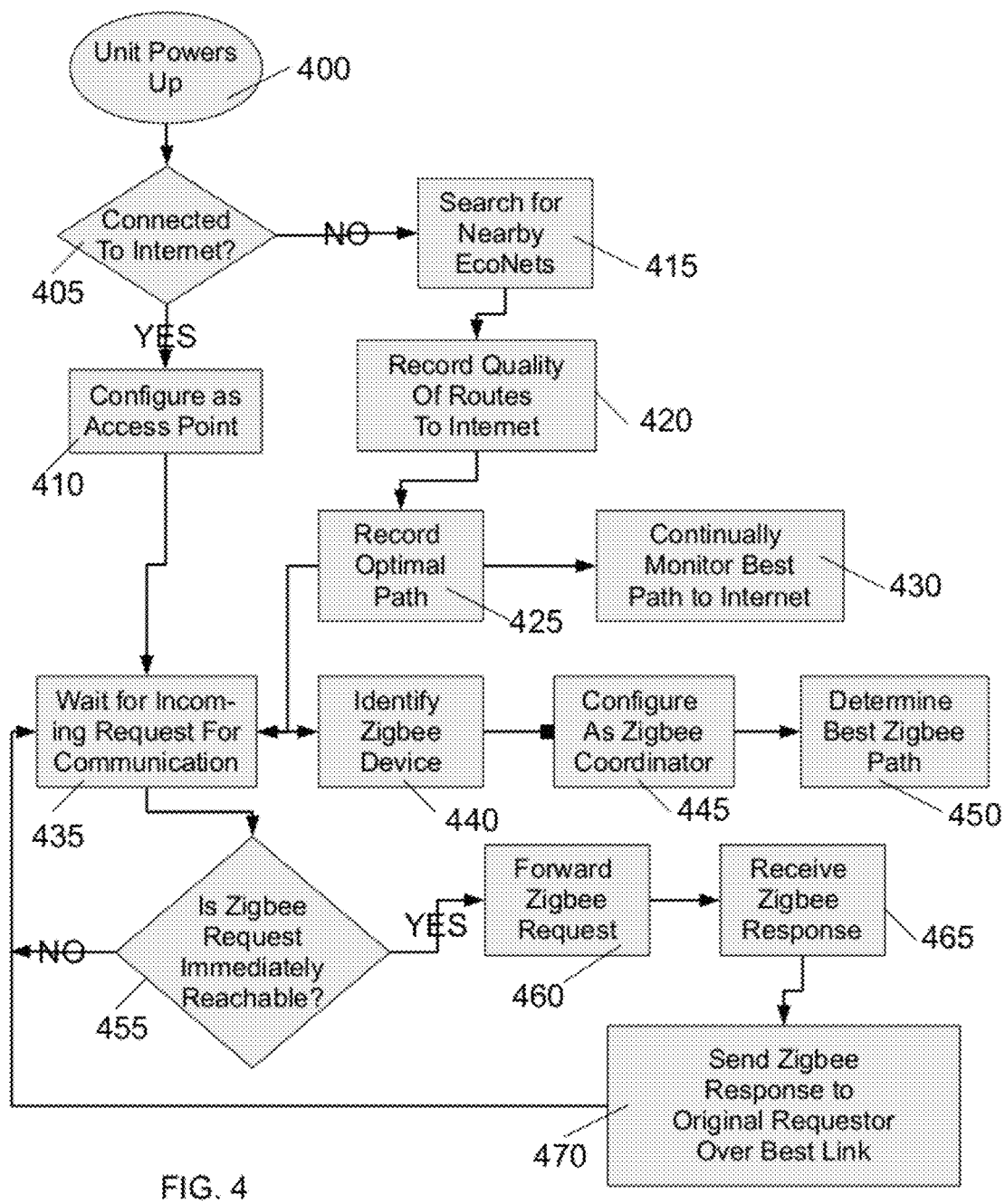
FIG. 4 is a flowchart illustrating an example of a process of implementing mixed mesh wireless networking, according to some embodiments.

Reference is now made to FIG. 4, which is a flow chart describing a series of steps to enable Mixed-mesh wireless networking in a smart grid network, according to some embodiments. Multiple Econet devices may be set up as substantially independent communication devices, each device may optionally be configured with very basic encryption information such that they may form a mesh network based on the overall needs of the network in real time. Multiple Econet devices may be set up with integrated PCB's for both 802.11 and 802.15.4 protocols, so as to enable mixed-mesh functioning. At block 400, the firmware for the Econet device is powered up, and then at block 405 the Econet device searches for an available path to the Internet. If an available path is found, at block 410, the Econet device configures itself as an access point (AP) or gateway to the Internet and/or other repeater Econets or Econet meshes, to connect to the EDS server or Internet. If no available path is found, at block 415, the Econet device scans for other Econet devices over WiFi to find an AP device. At block 420, the Econet device keeps track of the various paths and the quality of the paths or routes discovered to get to other AP devices, and calculates the optimal path. At block 425, the optimal path may be recorded. This decision may be based on distance, routers, bandwidth availability or other relevant criteria or combination of criteria.

At block 430, the Econet device continues to check for available paths, either periodically, continually or randomly, in order to maintain an updated status of the respective paths for communicating data through the smart grid network at any required time. If at any time communication fails or is otherwise determined to be unsuitable, the Econet device moves on to the next best path. At block 435, the Econet device may optionally wait for incoming requests for communication from the Internet, an EDS, another Econet device etc. Such a request may cause the EDS server to send requests to end devices to record their status. Once there is a backbone connection to the Internet set up, the EDS may be anywhere on the Internet/network, and can be located on any network segment. In some embodiments the EDS may be located in the data center; however it may also be deployed in a public cloud network such as Amazon's EC2 or Microsoft's Azure. The Econets' may thereby act, in some examples, as an extension of the utility company's LAN, providing connectivity from that LAN to the end devices.

At block 440, the Econet device may identify ZigBee devices that are connected to the ZigBee chip integrated into the Econet device. At block 445, once external ZigBee devices are identified, the Econet device may configure itself as a ZigBee coordinator, gateway or access point, thereby enabling the mesh to be is self-forming, in accordance with ZigBee protocol. At block 450, the ZigBee firmware in the Econet device determines the best mesh path for the external ZigBee devices previously identified, enabling the Econet device to form a network path, optionally exclusive of the Econet device. At block 455, the Econet device may monitor the communication quality on the ZigBee routes to determine if ZigBee is a viable or better pathway than Wi-Fi through which to route traffic, and if the relevant ZigBee devices are immediately reachable if necessary. If the Zig- Bee path is not immediately available, then the system further waits for Wi-Fi communication requests at block 435.

If the ZigBee path isn't available because the connection is down or for some other reason, the system may ignore the request. Typically, the ZigBee unit would re-form with another ZigBee coordinator (e.g., when the connection became bad) and the system would know about the new route once it was established, therefore the incoming request would generally have been routed through the correct new path. In the case where the request comes in before that new path is available, the request may be dropped, and picked up the next time it came through. In some examples, all requests may be initiated at the EDS, such that the system knows that if a request drops it can be located again later.

If the ZigBee path is immediately available, then at block 460 a ZigBee request (for example, a meter reads, communications status requests, thermostat reads/writes, light switch status requests, or load control events etc.) may be sent to an endpoint, and at block 465 a ZigBee response is received from the end device that is connected via ZigBee to provide the Econet with the data needed to determine which is the preferred or optimal communication link to use. For example, as requests come in for transmitting ZigBee device or network data (e.g., application or network operations, meter reads, load control events, thermostat commands, etc), the Econet may respond to the data request, at block 470, for example by routing the data or message through the ZigBee network to which it is attached, or through the Wi-Fi network to which it is attached, in accordance with the best or optimal communication link determined at the time. Of course, the ZigBee, Wi-Fi or ZigBee/Wi-Fi combined networks can be used to transmit data through the smart grid network. Other steps, orders of steps or combinations of steps may be used.

The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A mixed mesh networking method, comprising
   a mixed network communications device searching for a path to the Internet;
   when the path to the Internet is found, the mixed communications device self-configuring as an Internet access point;
   when the path to the Internet is not found, the mixed communications device scanning via Wi-Fi communication for another mixed communications device serving as the Internet access point and configuring itself as an Wi-Fi gateway;
   the mixed communications devices self-configuring as a ZigBee coordinator or a ZigBee gateway after identifying one or more ZigBee end devices that are connected to the mixed communications device via ZigBee communication;
   from the mixed network communications device, receiving or transmitting Wi-Fi signals via a Wi-Fi transceiver and PCB;
   from the mixed network communications device, receiving or transmitting ZigBee signals via a ZigBee transceiver and PCB from or to a ZigBee end device; and
   communicating the Wi-Fi signals and ZigBee signals via an antenna including an antenna connector,
   wherein the ZigBee end device comprises at least one member of the group consisting of a thermostat, a switch, a meter, and an appliance, and
   wherein the mixed network communications device is a separate device relative to the plurality of ZigBee end devices.

2. The mixed mesh networking method of claim 1, further comprising integrating the Wi-Fi transceiver and PCB and the ZigBee transceiver and PCB using a multi-mesh processor.

3. The mixed mesh networking method of claim 2, wherein the Wi-Fi transceiver and PCB is an 802.11 transceiver and PCB.

4. The mixed mesh networking method of claim 2, wherein the ZigBee transceiver and PCB is an 802.15.4 transceiver and PCB.

5. The mixed mesh networking method of claim 1, further comprising:
   the mixed network communication device tracking a plurality of routes to the Internet and a quality of each of the plurality of routes to the Internet.

* * * * *